United States Patent
Chen et al.

(10) Patent No.: US 11,288,227 B2
(45) Date of Patent: Mar. 29, 2022

(54) DRP DETERMINING SYSTEM AND DRP DETERMINING METHOD USING THE SAME

(71) Applicant: Qisda Corporation, Taoyuan (TW)

(72) Inventors: Kuan-Hung Chen, Taoyuan (TW); Min-Yi Hsieh, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 79 days.

(21) Appl. No.: 16/867,647

(22) Filed: May 6, 2020

(65) Prior Publication Data

US 2020/0394149 A1 Dec. 17, 2020

(30) Foreign Application Priority Data

Jun. 12, 2019 (CN) .......................... 201910506749.6

(51) Int. Cl.
*G06F 13/42* (2006.01)
*G06F 13/38* (2006.01)
*G06F 13/40* (2006.01)

(52) U.S. Cl.
CPC ........ *G06F 13/4286* (2013.01); *G06F 13/385* (2013.01); *G06F 13/4036* (2013.01); *G06F 13/4081* (2013.01); *G06F 2213/0042* (2013.01)

(58) Field of Classification Search
CPC .... G06F 13/00; G06F 13/4286; G06F 13/385; G06F 13/4036; G06F 13/4081; G06F 2213/0042
See application file for complete search history.

(56) References Cited

U.S. PATENT DOCUMENTS

| | | | |
|---|---|---|---|
| 10,218,129 B1* | 2/2019 | Mondal | G06F 13/4022 |
| 2016/0259005 A1* | 9/2016 | Menon | G01R 31/31705 |
| 2017/0070010 A1* | 3/2017 | Zupke | H03K 3/3565 |
| 2017/0124010 A1* | 5/2017 | Whitby-Strevens | G06F 13/385 |
| 2017/0220090 A1* | 8/2017 | Kim | G06F 1/10 |
| 2017/0351638 A1* | 12/2017 | Chen | G06F 13/385 |
| 2018/0004696 A1* | 1/2018 | Lee | G06F 13/4295 |
| 2018/0059771 A1* | 3/2018 | Kim | G06F 13/4282 |
| 2018/0089123 A1* | 3/2018 | Kulkarni | G06F 13/4282 |
| 2018/0109864 A1* | 4/2018 | Yamamoto | H04R 1/1016 |
| 2019/0213159 A1* | 7/2019 | Hsu | G06F 13/385 |
| 2019/0250689 A1* | 8/2019 | Ivanov | H02J 7/025 |
| 2019/0369708 A1* | 12/2019 | K | G06F 1/266 |
| 2019/0372375 A1* | 12/2019 | Kayama | H02J 7/00 |
| 2020/0226087 A1* | 7/2020 | Sun | H04N 21/44227 |
| 2020/0249742 A1* | 8/2020 | Mills | G06F 1/3215 |
| 2020/0394149 A1* | 12/2020 | Chen | G06F 13/385 |

OTHER PUBLICATIONS

Plugable, Plugable USB-C4K Keeps Disconnecting and Reconnecting, Jan. 27, 2020.*

* cited by examiner

*Primary Examiner* — Henry Tsai
*Assistant Examiner* — Kim T Huynh

(57) ABSTRACT

A DRP determining method is provided. The method includes the following steps. Firstly, a first DRP electronic device and a second DRP electronic device are connected by a USB Type-C line. Then, the first DRP electronic device is set to one of a host and a device. Then, the second DRP electronic device is set to one of the host and the device. When the connection between the first DRP electronic device and the second DRP electronic device is disconnected and then re-connected, at least one of the first DRP electronic device and the second DRP electronic device is set to the other one of the host and the device.

18 Claims, 3 Drawing Sheets

DRP DETERMINING SYSTEM AND DRP DETERMINING METHOD USING THE SAME

This application claims the benefit of People's Republic of China application Serial No. 201910506749.6, filed on Jun. 12, 2019, the subject matter of which is incorporated herein by reference.

BACKGROUND OF THE INVENTION

Field of the Invention

The invention relates in general to a determining system and a determining method using the same, and more particularly to a DRP determining system and a DRP determining method using the same.

Description of the Related Art

In general, the USB Type-C specification defines 3 roles. For example, when the electronic device is a downstream facing port (DFP) device, the electronic device is defined as a host; when the electronic device is an upstream facing port (UFP) device, the electronic device is defined as a device; when the electronic device is a dual role port (DRP) device, the electronic device is randomly defined as a host or a device. Each time when 2 DRP devices are coupled to each other, each DRP device randomly decides its role to the host or the device.

Since each DRP device randomly decides its role, it is very likely that role matching error may occur.

Therefore, it has become a prominent task for the industries to provide a method for increasing the role matching efficiency of the DRP device.

SUMMARY OF THE INVENTION

The invention is directed to a DRP determining system and a DRP determining method using the same for resolving the above problems.

According to one embodiment of the present invention, a DRP determining method. The DRP determining method includes the following steps. a first DRP electronic device and a second DRP electronic device are connected by a USB Type-C line; the first DRP electronic device is set to one of a host and a device; the second DRP electronic device is set to one of the host and the device; and, when the connection between the first DRP electronic device and the second DRP electronic device is disconnected and then re-connected, at least one of the first DRP electronic device and the second DRP electronic device is set to the other one of the host and the device.

According to another embodiment of the present invention, a DRP determining method. The DRP determining method includes a first DRP electronic device, a second DRP electronic device and a USB Type-C line. The first DRP electronic device is configured to set to one of a host and a device. The second DRP electronic device is configured to set to one of the host and the device. The USB Type-C line connects the first DRP electronic device and the second DRP electronic device. When the connection between the first DRP electronic device and the second DRP electronic device is disconnected and then re-connected, at least one of the first DRP electronic device and the second DRP electronic device is set to the other one of the host and the device.

The above and other aspects of the invention will become better understood with regard to the following detailed description of the preferred but non-limiting embodiment(s). The following description is made with reference to the accompanying drawings.

DETAILED DESCRIPTION OF THE INVENTION

For the object, technical features and advantages of the present invention to be more easily understood by anyone ordinary skilled in the technology field, a number of exemplary embodiments are disclosed below with detailed descriptions and accompanying drawings.

Figure 1:
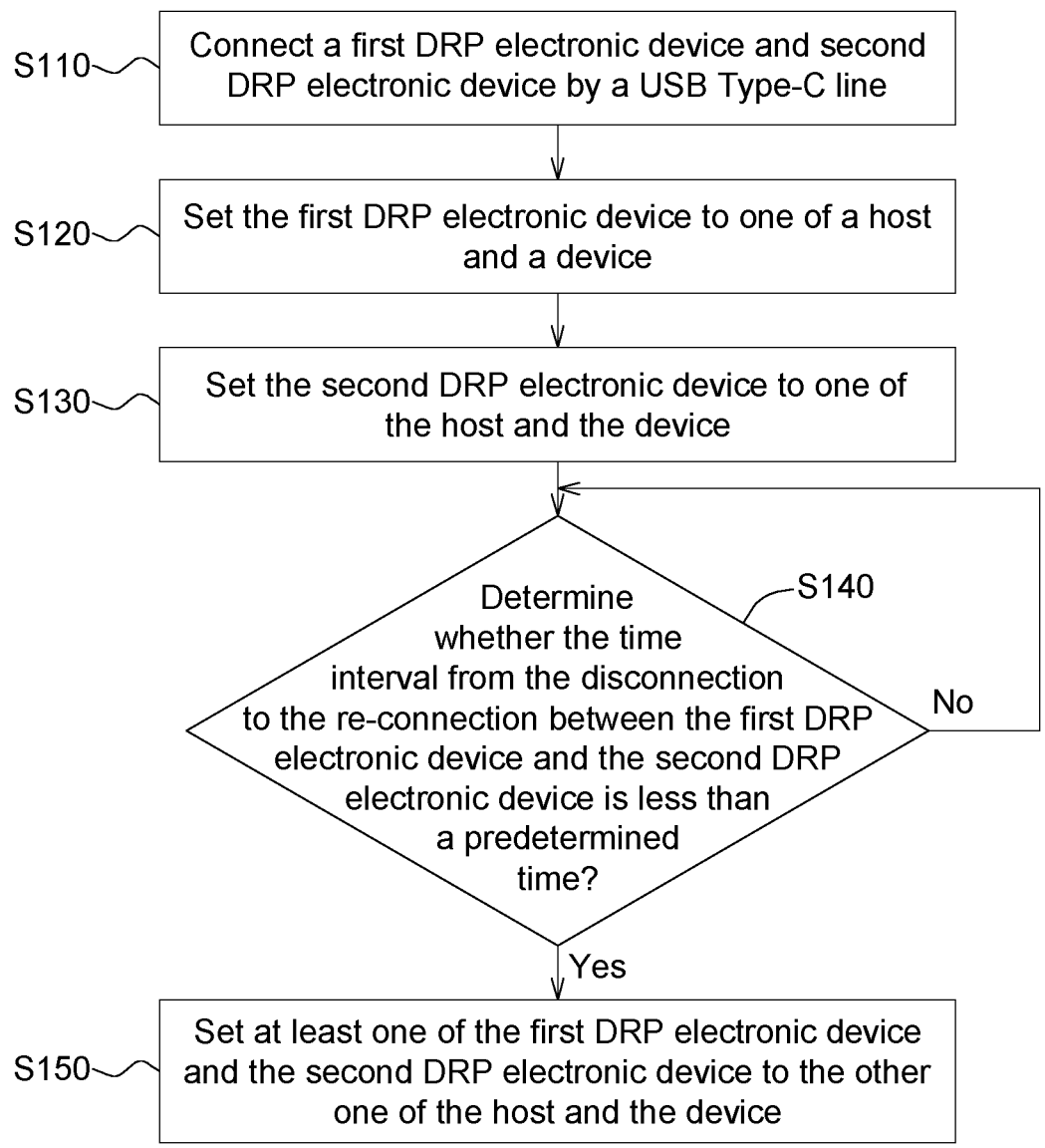
FIG. 1 is a flowchart of a DRP determining method of a USB Type-C connected device according to an embodiment of the invention.
Figure 2A:
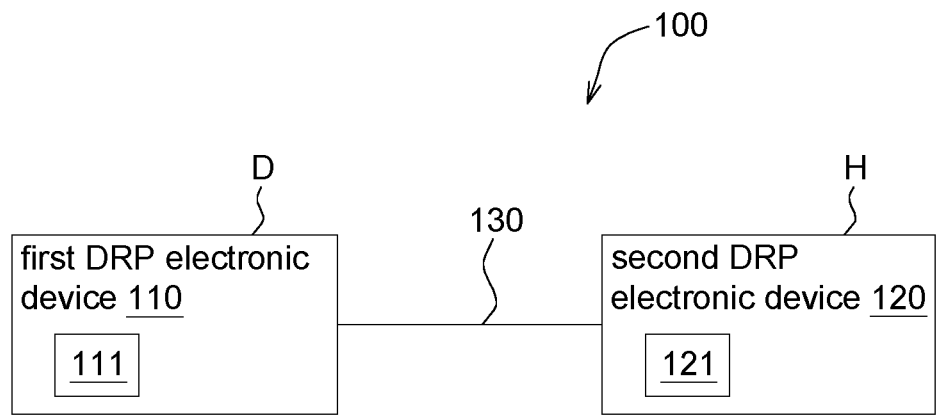
FIG. 2A is a schematic diagram of the connection between a first DRP electronic device and a second DRP electronic device of a DRP determining system being coupled to each other according to an embodiment of the invention.
Figure 2B:
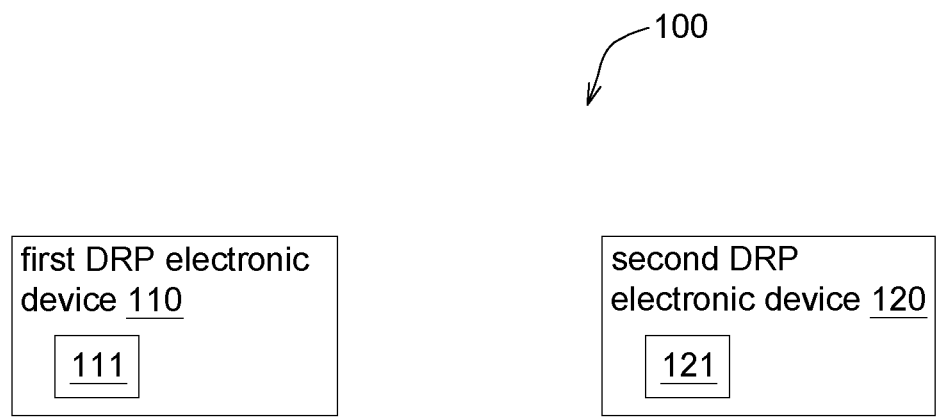
FIG. 2B is a schematic diagram of the connection between the first DRP electronic device and the second DRP electronic device of FIG. 2A being disconnected.
Figure 2C:
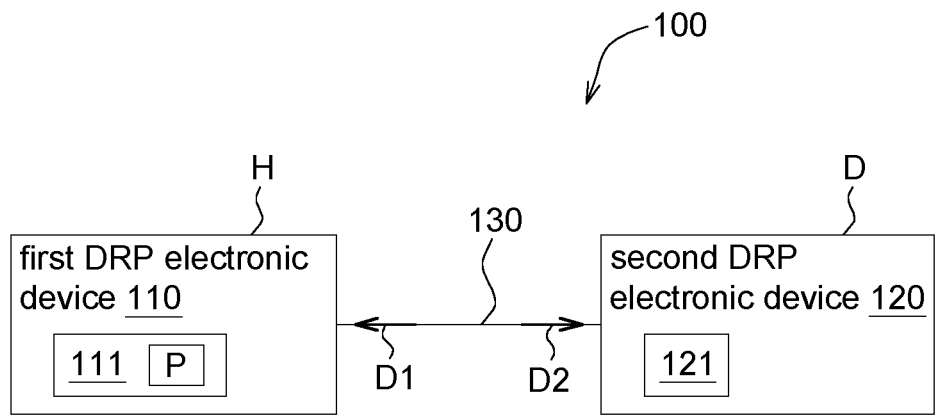
FIG. 2C is a schematic diagram of the connection between the first DRP electronic device and the second DRP electronic device of FIG. 2B being re-connected.
Figure 3:
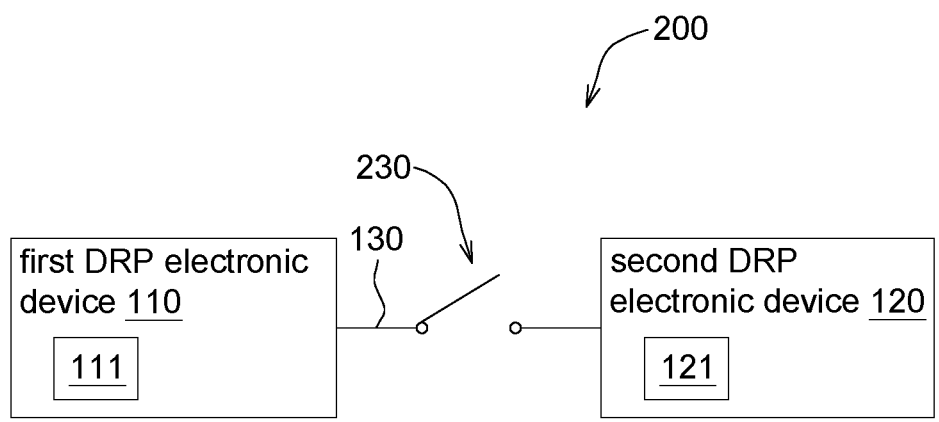
FIG. 3 is a first DRP electronic device and a second DRP electronic device of a DRP determining system being coupled to each other according to another embodiment of the invention.

Refer to FIGS. 1, 2A~2C and 3. FIG. 1 is a flowchart of a DRP determining method of a USB Type-C connected device according to an embodiment of the invention. FIG. 2A is a schematic diagram of the connection between a first DRP electronic device 110 and a second DRP electronic device of a DRP determining system 100 being coupled to each other according to an embodiment of the invention. FIG. 2B is a schematic diagram of the connection between the first DRP electronic device 110 and the second DRP electronic device 120 of FIG. 2A being disconnected. FIG. 2C is a schematic diagram of the connection between the first DRP electronic device 110 and the second DRP electronic device 120 of FIG. 2B being re-connected. FIG. 3 is a first DRP electronic device 110 and a second DRP electronic device 120 of a DRP determining system 200 being coupled to each other according to another embodiment of the invention.

In step S110, as indicated in FIG. 2A, a first DRP electronic device 110 and a second DRP electronic device 120 are connected by a USB Type-C line 130. The first DRP electronic device 110, the second DRP electronic device 120 and the USB Type-C line 130 form at least one part of a DRP determining system 100. In an embodiment, the USB Type-C line 130 can be a connection line independent of the first DRP electronic device 110 and the second DRP electronic device 120 or integrated in the first DRP electronic device 110 or the second DRP electronic device 120.

In the present embodiment, the first DRP electronic device 110 is exemplified by a computer (such as a PC tablet or a notebook computer) and the second DRP electronic device 120 is exemplified by a mobile phone, but the invention is not limited thereto.

In step S120, after the first DRP electronic device 110 and the second DRP electronic device 120 are coupled to each other, the first DRP electronic device 110 is set to one of a host H and a device D according to the USC Type-C protocol. For example, the first DRP electronic device 110 is randomly set to one of the host H and the device D. In the present embodiment, as indicated in FIG. 2A, the first DRP electronic device 110 is randomly set to the device D.

In step S130, after the first DRP electronic device 110 and the second DRP electronic device 120 are coupled to each other, the second DRP electronic device 120 is set to one of the host H and the device D according to the USC Type-C protocol. For example, the second DRP electronic device 120 is randomly set to one of the host H and the device D. In the present embodiment, as indicated in FIG. 2A, the second DRP electronic device 120 is randomly set to the host H.

In step S140, whether the time interval from the disconnection (as indicated in FIG. 2B) to the re-connection (as indicated in FIG. 2C) of the connection between the first DRP electronic device 110 and the second DRP electronic device 120 is less than a predetermined time is determined. If the determination is affirmative, the method proceeds to step S150; if the determination is negative, the method returns to step S140, whether the connection between the first DRP electronic device 110 and the second DRP electronic device 120 is disconnected (as indicated in FIG. 2B) and then re-connected is determined.

If the user determines or finds that role matching between the first DRP electronic device 110 and the second DRP electronic device 120 is incorrect, the connection between the first DRP electronic device 110 and the second DRP electronic device 120 is forced to be disconnected (as indicated in FIG. 2B) and then quickly re-connected (as indicated in FIG. 2C), such that the first DRP electronic device 110 and the second DRP electronic device 120 can perform role matching again.

If role matching between the first DRP electronic device 110 and the second DRP electronic device 120 is incorrect, one of the first DRP electronic device 110 and the second DRP electronic device 120 cannot access the data from the other one of the first DRP electronic device 110 and the second DRP electronic device 120.

A method by which the user determines whether the role matching between the first DRP electronic device 110 and the second DRP electronic device 120 is: determining whether the display monitor 111 of the first DRP electronic device 110 displays a disc pattern P (illustrated in FIG. 2C). If the display monitor 111 of the first DRP electronic device 110 does not display the disc pattern P, this indicates that the first DRP electronic device 110 cannot recognize the second DRP electronic device 120 (role matching is incorrect). Under such circumstances, the first DRP electronic device 110 cannot access data from the second DRP electronic device 120. For the first DRP electronic device 110 to access data from the second DRP electronic device 120, the user disconnects and then re-connects the connection between the first DRP electronic device 110 and the second DRP electronic device 120.

Another method by which the user determines whether the role matching between the first DRP electronic device 110 and the second DRP electronic device 120 is correct is: determining whether the second DRP electronic device 120 displays a charging state (for example, the charging indicator of the second DRP electronic device 120 is turned on). If the second DRP electronic device 120 does not display the charging state, this indicates that the first DRP electronic device 110 cannot recognize the second DRP electronic device 120 (role matching is incorrect). Under such circumstances, the first DRP electronic device 110 cannot charge the second DRP electronic device 120. For the first DRP electronic device 110 to charge the second DRP electronic device 120, the connection between the first DRP electronic device 110 and the second DRP electronic device 120 is disconnected and then re-connected.

In an example, if the first DRP electronic device 110 cannot recognize the second DRP electronic device 120, the first DRP electronic device 110 can send a prompt message indicating "cannot recognize" to remind the user. The prompt message can be an exclamation mark displayed on the display monitor 111, a sound or voice made by the speaker of the first DRP electronic device 110, a light transmitted from a light emitting element (not illustrated) of the first DRP electronic device 110, or a vibration made by a vibrator (not illustrated) of the first DRP electronic device 110.

Also, the connection between the first DRP electronic device 110 and the second DRP electronic device 120 can be disconnected and then re-connected by unplugging and then plugging the first DRP electronic device 110 or the second DRP electronic device 120. Or, as indicated in FIG. 3, the switch 230 is disposed on the USB Type-C line 130 to selectively y disconnect and then re-connect the connection between the first DRP electronic device 110 and the second DRP electronic device 120. For example, the switch 230 can be switched to a "turn-off state", and after the connection between the first DRP electronic device 110 and the second DRP electronic device 120 is connected, the switch 230 is switched to a "turn-on state" to re-connect the connection between the first DRP electronic device 110 and the second DRP electronic device 120.

In step S140, the time interval from the disconnection to the re-connection of the connection between the first DRP electronic device 110 and the second DRP electronic device 120 is compared with a predetermined time, wherein the predetermined time is such as 1 second, or can be longer or shorter than 1 second, such as any value between 0.5~seconds. If the time interval from the disconnection to the re-connection of the connection between the first DRP electronic device 110 and the second DRP electronic device 120 is less than the predetermined time, the method proceeds to step S150, the first DRP electronic device 110 and the second DRP electronic device 120 rearrange their roles. If the time interval is not less than the predetermined time, this indicates that the user's intent is not for achieving a correct role matching, and the method returns to step S140.

In step S150, at least one of the first DRP electronic device 110 and the second DRP electronic device 120 is set to the other one of the host H and the device D. In the present embodiment, as indicated in FIG. 2C, if the time interval from the disconnection to the re-connection of the connection between the first DRP electronic device 110 and the second DRP electronic device 120 is less than the predetermined time, the first DRP electronic device 110 is set to the host H from the device D which is set prior to the re-connection, and the second DRP electronic device 120 is set to the device D from the host H which is set prior to the re-connection, such that the first DRP electronic device 110 and the second DRP electronic device 120 can be matched correctly.

As indicated in FIG. 2C, if the first DRP electronic device 110 and the second DRP electronic device 120 are correctly matched, the display monitor 111 of the first DRP electronic device 110 displays a disc pattern P to indicate that the first DRP electronic device 110 successfully recognizes the second DRP electronic device 120, and therefore can access data from the disc 121 of the second DRP electronic device 120. For example, the first DRP electronic device 110 (such as a computer) can access data D1 from the disc 121 (such as a mobile phone) of the second DRP electronic device 120, and the first DRP electronic device 110 (such as a computer) can transmit data D2 to the disc 121 (such as a mobile phone) of the second DRP electronic device 120.

In the above embodiments, the first DRP electronic device 110 is exemplified by a computer and the second DRP electronic device 120 is exemplified by a mobile phone, but these exemplifications are not for limiting the invention.

In another embodiment, the first DRP electronic device 110 can be realized by a mobile phone, and the second DRP electronic device 120 can be realized by a video recorder. If the mobile phone and the video recorder are correctly matched, the first DRP electronic device 110 can access data (such as an image) from the disc 121 of the second DRP electronic device 120; or, the second DRP electronic device 120 can transmit the captured image to the first DRP electronic device 110 through wired or wireless communication or through active transmission.

In other embodiments, the first DRP electronic device 110 can be realized by a computer, and the second DRP electronic device 120 can be realized by a video recorder. If the computer and the video recorder are correctly matched, the first DRP electronic device 110 can access data (such as an image) from the disc 121 of the second DRP electronic device 120; or, the second DRP electronic device 120 can transmit the captured image to the first DRP electronic device 110 through wired or wireless communication or through active transmission.

The invention is not restrictive of the types of the first DRP electronic device 110 and the second DRP electronic device 120, and any two DRP electronic devices whose roles need to be matched when coupled to each other are within the application scope of the invention. The DRP determining method disclosed in above embodiments of the invention can reduce the number of times of re-connecting the two DRP devices whenever their connection is disconnected, and increase the role matching efficiency of the two devices.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual role port (DRP) determining method for a USB Type-C connected device, comprising:
   connecting a first DRP electronic device and a second DRP electronic device by a USB Type-C line;
   setting the first DRP electronic device to one of a host and a device;
   setting the second DRP electronic device to one of the host and the device; and
   setting at least one of the first DRP electronic device and the second DRP electronic device to the other one of the host and the device when the connection between the first DRP electronic device and the second DRP electronic device is disconnected and then re-connected and if a time interval from the disconnection to the re-connection of the connection between the first DRP electronic device and the second DRP electronic device is less than a predetermined time.

2. The DRP determining method according to claim 1, wherein in the step of setting the first DRP electronic device to the one of the host and the device, the first DRP electronic device is set to the device; in the step of setting the second DRP electronic device to the one of the host and the device, the second DRP electronic device is set to the host; in the step of setting one of the first DRP electronic device and the second DRP electronic device to the other one of the host and the device, the first DRP electronic device is set to the host from the device, and the second DRP electronic device is set to the device from the host.

3. The DRP determining method according to claim 1, wherein in the step of setting the first DRP electronic device to one of the host and the device, the first DRP electronic device is randomly set to the host or the device;
   in the step of setting the second DRP electronic device to the one of the host and the device the second DRP electronic device is randomly set to the host or the device.

4. The DRP determining method according to claim 1, wherein the predetermined time is greater than 1 and less than 3 seconds.

5. The DRP determining method according to claim 1, if the time interval from the disconnection to the re-connection of the connection between the first DRP electronic device and the second DRP electronic device between the first DRP electronic device and the second DRP electronic device is less than the predetermined time, the first DRP electronic device is randomly set to the host or the device, and the second DRP electronic device is randomly set to the host or the device.

6. The DRP determining method according to claim 1, wherein after the first DRP electronic device and the second DRP electronic device are connected by the USB Type-C line, the DRP determining method further comprises:
   determining whether the first DRP electronic device and the second DRP electronic device display a disc pattern; and
   disconnecting and then re-connecting the connection between the first DRP electronic device and the second DRP electronic device if none of the first DRP electronic device and the second DRP electronic device displays the disc pattern.

7. The DRP determining method according to claim 1, wherein after the first DRP electronic device and the second DRP electronic device are connected by the USB Type-C line, the DRP determining method further comprises:
   determining whether the first DRP electronic device and the second DRP electronic device display a charging state; and
   disconnecting and then re-connecting the connection between the first DRP electronic device and the second DRP electronic device if none of the first DRP electronic device and the second DRP electronic device displays the charging state.

8. The DRP determining method according to claim 1, further comprising:
   unplugging and then plugging the first DRP electronic device and the second DRP electronic device to disconnect and then re-connect the connection between the first DRP electronic device and the second DRP electronic device.

9. The DRP determining method according to claim 1, wherein a switch is disposed on the USB Type-C line to selectively disconnect and then re-connect the connection between the first DRP electronic device and the second DRP electronic device; the DRP determining method further comprises:
  disconnecting and then re-connecting the connection between the first DRP electronic device and the second DRP electronic device by the switch.

10. A DRP determining system, comprising:
  a first DRP electronic device configured to set to one of a host and a device;
  a second DRP electronic device configured to set to one of the host and the device; and
  a USB Type-C line configured to connect the first DRP electronic device and the second DRP electronic device;
  wherein when the connection between the first DRP electronic device and the second DRP electronic device is disconnected and then re-connected and if a time interval from the disconnection to the re-connection of the connection between the first DRP electronic device and the second DRP electronic device is less than a predetermined time, at least one of the first DRP electronic device and the second DRP electronic device is set to the other one of the host and the device.

11. The DRP determining system according to claim 10, wherein the first DRP electronic device is set to the device, and the second DRP electronic device is set to the host;
  wherein when the connection between the first DRP electronic device and the second DRP electronic device is disconnected and then re-connected, the first DRP electronic device is set to the host from the device, and the second DRP electronic device is set to the device from the host.

12. The DRP determining system according to claim 10, wherein the first DRP electronic device is randomly set to the host or the device, and the second DRP electronic device is randomly set to the host or the device.

13. The DRP determining system according to claim 10, wherein the predetermined time is greater than 1 and less than 3 seconds.

14. The DRP determining system according to claim 10, if the time interval from the disconnection to the re-connection of the connection between the first DRP electronic device and the second DRP electronic device is less than the predetermined time, the first DRP electronic device is randomly set to the host or the device, and the second DRP electronic device is randomly set to the host or the device.

15. The DRP determining system according to claim 10, wherein the first DRP electronic device and the second DRP electronic device are configured to determine whether a DRP determination is correct; if the DRP determination is incorrect, none of the first DRP electronic device and the second DRP electronic device displays the disc pattern.

16. The DRP determining system according to claim 10, wherein the first DRP electronic device and the second DRP electronic device are configured to determine whether a DRP determination is correct; if the DRP determination is incorrect, none of the first DRP electronic device and the second DRP electronic device displays charging state.

17. The DRP determining system according to claim 10, wherein when the first DRP electronic device and the second DRP electronic device are unplugged and then plugged, the at least one of the first DRP electronic device and the second DRP electronic device is set to the other one of the host and the device.

18. The DRP determining system according to claim 10, further comprising:
  a switch configured on the USB Type-C line to selectively disconnect and then re-connect the connection between the first DRP electronic device and the second DRP electronic device;
  wherein when the switch is switched to the turn-off state from the turn-on state, the at least one of the first DRP electronic device and the second DRP electronic device is set to the other one of the host and the device.

* * * * *